Figure 1:
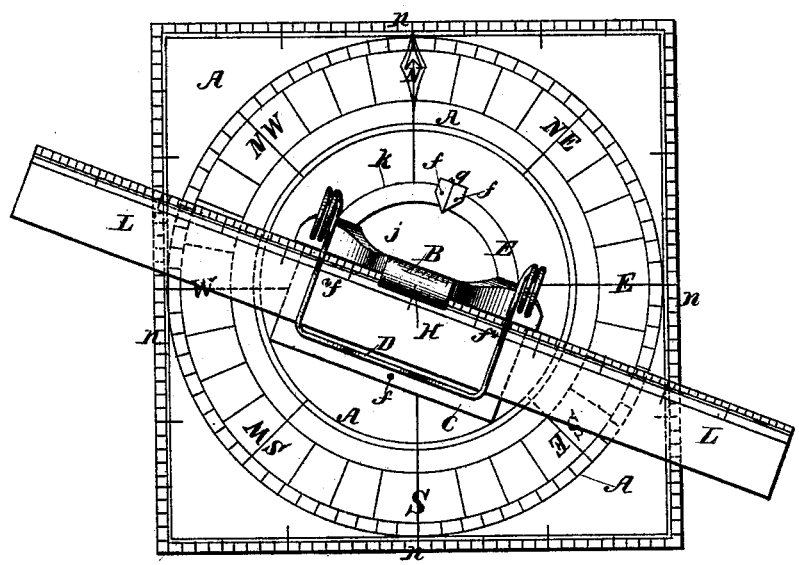
Figure 2:
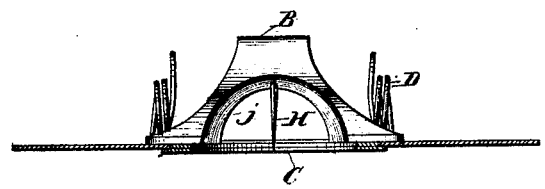

R. T. OSGOOD.
PROTRACTOR.

No. 190,611. Patented May 8, 1877.

Witnesses.
Silas B. Warren
Rufus H. Emery

Inventor.
Robert T. Osgood.

UNITED STATES PATENT OFFICE.

ROBERT T. OSGOOD, OF ORLAND, MAINE.

IMPROVEMENT IN PROTRACTORS.

Specification forming part of Letters Patent No. 190,611, dated May 8, 1877; application filed September 5, 1876.

*To all whom it may concern:*

Be it known that I, ROBERT T. OSGOOD, of Orland, in the county of Hancock and State of Maine, have invented certain Improvements in Indicators, of which the following is a specification:

My invention consists of a revolving or rotating gage, B, in combination with a square base, A, having the central portion cut to a circular line, $k$, and another piece fitted into its place, so that it will rotate E, this rotating piece E, having a semicircular opening cut out from the central line $k$ to within about a quarter of an inch of its outside circumference, which forms a D-shaped opening, $j$, so that the central point can be seen, and also the point upon the map or drawing to which it may be applied for the exact starting-point. The vertical center-point H is made of a flat piece of steel, soldered to the arched portion of the gage B, extending downward through the semicircular opening $j$, at the exact center of the rotary disk E, and is hooked up through the horizontal plate C, to keep both ends of this center-point H steadily fixed in the center. I have circular lines struck upon the face of the base A, with all the points of the compass, with the degrees, letters, figures, or other marks necessary to facilitate the object of readily adjusting the gage-arm to any desired point upon this disk A. The north, east, south, and west points end exactly at the central mark of the graduated sides of the base A, which is on the graduated edges $n$. This base I have spaced and marked in equal divisions, by inches and tenths, upon each of its four sides, to conform exactly to like marks upon the scale or arm L used to get the direction to any desired point.

The arm or scale L is made flat, of any desirable width or length, and marked by inches and tenths to exactly conform to the marginal marks upon the base A. It may be made of any desirable length or material, with any other additional marks or spaces, providing they do not interfere with the tenth-mark line.

The scale of Belcher Brothers of New York is well adapted for an indicator-arm, as it is much used by navigators and others, to find the exact distances required. When this arm L is put in under the spring D, and pressed up to the vertical side of the gage B, the spring will keep it there, and by turning the rotating disk E till the arm arrives to the point of destination the exact course is indicated upon the compass, and, by spacing or counting, the exact distance can be determined, the base always being placed upon the map or chart precisely north and south by its lines, and the difference between the line and starting-point can be counted out upon the base to get the exact point sought for. I have a horizontal piece of plate, C, like the base, secured by screws $ff$ to the central rotary part of the gage E, making part of it, with straight parallel sides and angles, so that the outside angle will indicate, when the gage is set exactly north and south, the marks upon the base-disk of S. W. and N. W.

The horizontal plate C serves to keep the rotary part E in position, hold the lower end of the vertical center-point H in its place, and to form a rotating base for the gage-arm, over the main base A, and to hold the indicator arm or scale. I have a clamp, $g$, secured to the rotary disk E, to keep its side in place by extending it over upon the face of the base A. To the disk E the vertical gage B is secured by screws $f$ at each side and end, and the horizontal plate is also secured to the same by screws $ff$. The spring of the gage is made of wire D by taking two round turns near each end of a piece long enough to form the whole spring and clasp portion, with the middle portion raised or bent upward, so as to form a holding to raise it up to put in the arm L. The ends of this I solder into the ends of the gage B, it being bent around for that purpose.

Referring to the drawings, A is the base. B is the vertical portion of the gage. C is the horizontal plate or base for the gage-arm. D is the wire spring secured to B to keep the indicator arm or scale within its grasp. E is a portion of the rotary part of the disk, and $ff$ are the screws. $g$ is a small clamp to hold the rotary disk in place. H is the vertical center-point. $j$ is the disk-opening. $k$ is a portion of the central disk-line. $n$ are the graduated marks upon the four sides of the base A. L is the indicator-arm.

This invention can be made larger or smaller, as may be desirable for the work wanted.

I claim—

1. The vertical center-point H, secured to the gage B, and extending down through the semicircular central opening of the rotating disk E, substantially as described.

2. The horizontal gage-plate C, with spring D, in combination with the rotary disk E and base A, substantially as described.

ROBERT T. OSGOOD.

Witnesses:
SILAS B. WARREN,
RUFUS H. EMERY.